Sept. 3, 1940.    G. J. MEUER    2,213,470
SAFETY DEVICE FOR POWER OPERATED WRINGERS
Filed Dec. 23, 1937    2 Sheets-Sheet 1
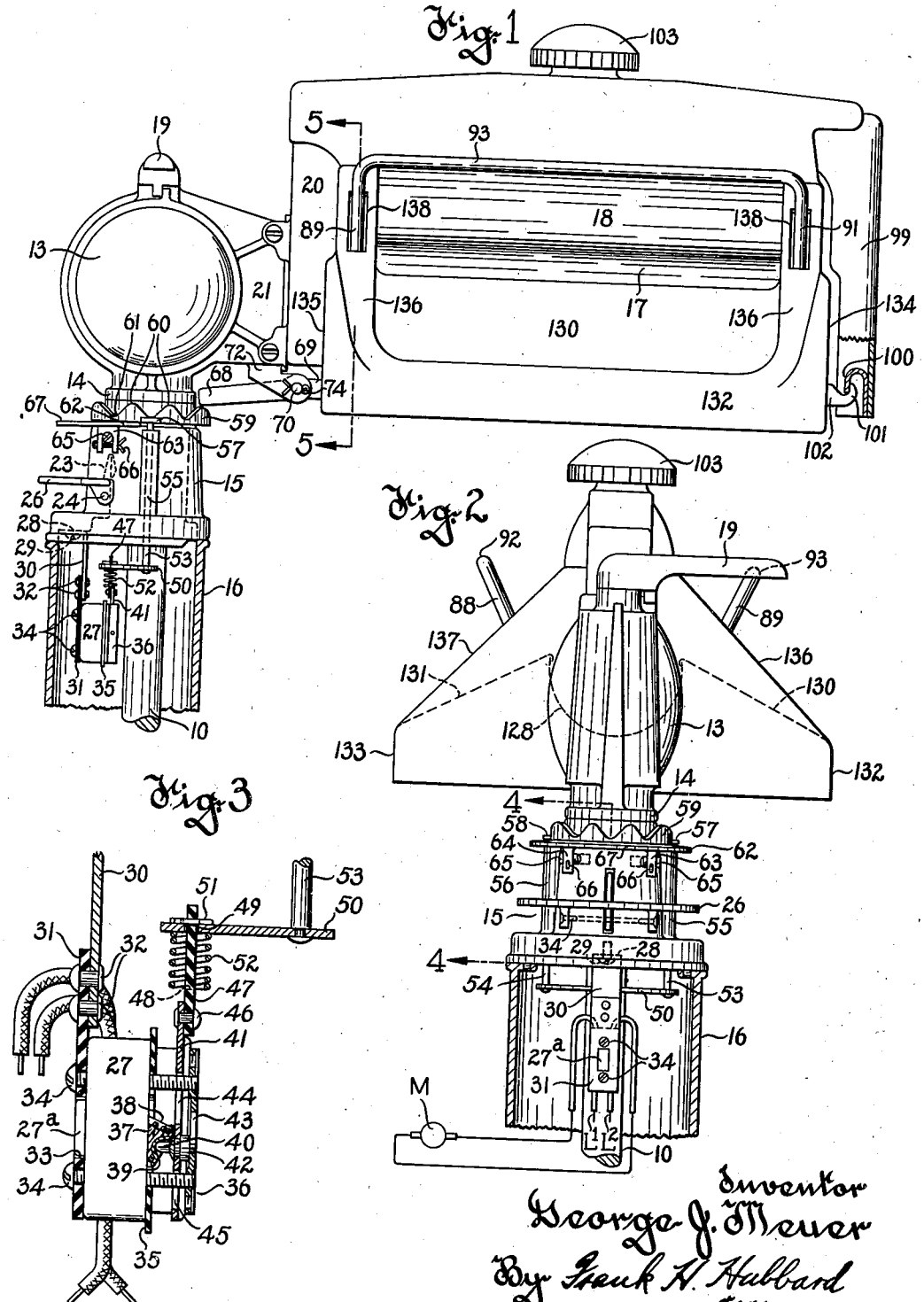
Inventor
George J. Meuer
By Frank N. Hubbard
Attorney

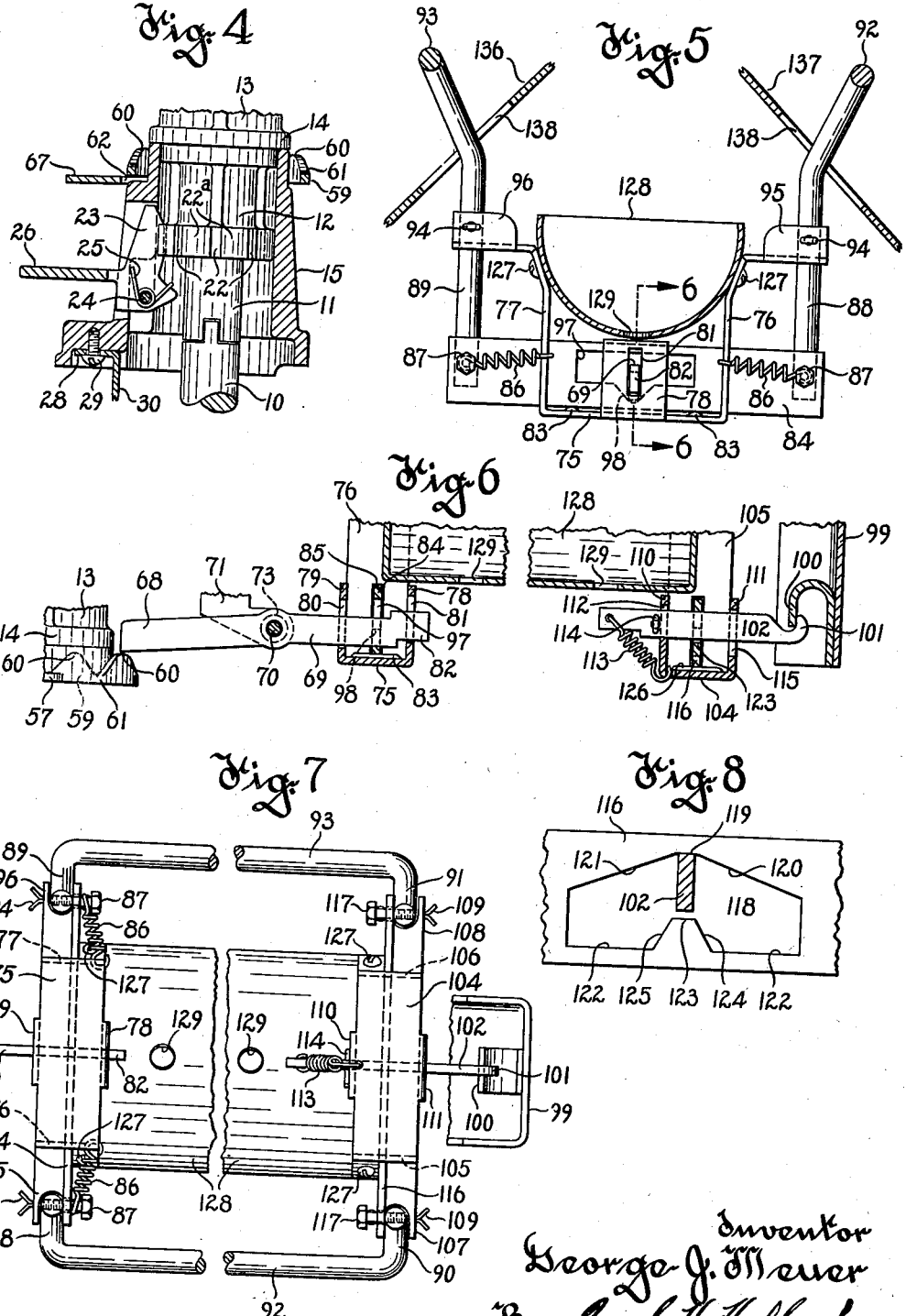

Patented Sept. 3, 1940

2,213,470

UNITED STATES PATENT OFFICE 2,213,470

SAFETY DEVICE FOR POWER OPERATED WRINGERS

George J. Meuer, Milwaukee, Wis., assignor to Cutler-Hammer, Inc., Milwaukee, Wis., a corporation of Delaware Application December 23, 1937, Serial No. 181,291

18 Claims. (Cl. 68—253)

This invention relates to improvements in safety devices for power operated wringers.

An object of the invention is to improve the mechanical elements and the control features of safety devices of the aforementioned character.

Another object is to provide a safety device which is particularly adapted for use with electric motor operated wringers having mountings of the turntable type.

Another object is to provide novel means to insure against operation of the wringer rolls during movement of the wringer upon its turntable from one angular position to another.

Another object is to insure proper functioning of all elements of the safety device regardless of the angular position of the wringer with respect to its turntable.

Another object is to provide a novel form of safety device whereby interruption of the circuit of the wringer driving motor and release of the usual spring pressure upon the wringer rolls may be effected substantially simultaneously but in a predetermined sequence.

Another object is to provide a device of the aforementioned character wherein an element of the safety release may be manually operated through a very small portion of its range of movement to effect interruption of the circuit of the electric driving motor without requiring operation of the means for effecting release of the spring pressure applied to the wringer rolls.

Another and more specific object is to facilitate use by the operator of one or another of a plurality of safety release elements to effect interruption of the circuit of the electric driving motor, in the normal use of the wringer and washing machine, whereby the operator is familiarized with the position and manner of operating the safety device to insure proper use thereof in an emergency.

Another object is to provide for mounting of the electric switch in a concealed and protected position away from the wringer frame.

Another object is to provide a safety device which may be applied to a wringer without substantially detracting from the normal neat and compact appearance of the latter.

Another object is to provide a safety device of the aforementioned character the parts of which are of sturdy and fool-proof construction and not likely to get out of order.

Other objects and advantages of the invention will hereinafter appear.

The accompanying drawings illustrate an embodiment of the invention which will now be described—it being understood that the embodiment illustrated is susceptible of modification, in respect of certain details of construction thereof, without departing from the spirit and scope of the invention as defined in the appended claims.

In the drawings, Figure 1 is a view, partly in elevation and partly in section, of a motor operated wringer having my improved safety device associated therewith.

Fig. 2 is a similar view from the left-hand side of Fig. 1—a portion of the upright or turntable support for the wringer being cut away to illustrate the preferred manner of mounting the switch and certain of the operating elements therefor.

Fig. 3 is an enlarged sectional view of parts of the switch and certain of the mounting and operating elements associated therewith.

Fig. 4 is a sectional view on the line 4—4 of Fig. 2.

Fig. 5 is a fragmentary view, partly in section on the line 5—5 of Fig. 1.

Fig. 6 is a fragmentary and contracted sectional view on the line 6—6 of Fig. 5, with the parts arranged in the relative positions thereof illustrated in Fig. 1.

Fig. 7 is a fragmentary and contracted bottom plan view of certain of the parts illustrated in Figs. 5 and 6, and Fig. 8 is an enlarged fragmentary view of the mechanical latch operating means shown at the right-hand side of Fig. 6—the latch member being shown in section.

Referring to the drawings, the numeral 10 designates a shaft which is adapted to be driven by an electric motor—the latter being shown diagrammatically at M at the lower end of Fig. 2. It is to be understood that any suitable form of washing machine (not shown) may also be associated with motor M to be driven by the latter— the usual clutch or the like being provided to effect connection of the washing machine to or disconnection thereof from the motor M. The means hereinafter described are adapted to provide for energization or de-energization of motor M whether either the washing machine or wringer, or both are connected with or disconnected from said motor M.

As shown in Fig. 4 shaft 10 at its upper end has a driving connection with a stub-shaft 11 which bears within a hollow downward extension 12 of a casing 13—a flanged portion 14 of which is rotatably seated upon the upper end of a hollow metal member 15 which is secured to and forms a part of the hollow upright 16 (Fig. 1) within which shaft 10 is concealed. Casing 13 houses a well known form of clutch mechanism and gearing whereby the lower wringer roll 17 may be connected with stub-shaft 11 to be driven by the latter in either direction, or disconnected from said stub-shaft. Wringer roll 18 is so arranged in any suitable manner as to provide for rotation thereof in a direction opposite to the direction of rotation of roll 17. The manually operable clutch means comprises a lever 19 carried by casing 13—said lever in the position thereof illustrated in Figs. 1 and 2 being adapted to provide for operation of wringer roll 17 in one direction. Lever 19 (Fig. 2) when moved to the left through an angle of 180 degrees is adapted to provide for operation of roll 17 in the reverse direction—whereas said lever in its intermediate or mid-position provides for disconnection of roll 17 from said stub-shaft 11.

The wringer frame, designated in general by the numeral 20 (Fig. 1), is attached to and supported by the laterally extending portion 21 of casing 13—said extension likewise serving to house and protect the shaft (not shown) which extends laterally from the wringer roll 17 for cooperation with the aforementioned gearing in casing 13.

From the foregoing description it will be apparent that casing 13, with its associated wringer, may be swung or rotated in either direction to any desired angular position with respect to member 15 forming part of upright 16. In order to positively latch the wringer in any one of a number of different angular positions, the aforementioned extension 12 is provided with a plurality (preferably eight) notches 22 (Fig. 4) which are respectively adapted to receive a latch 23 which is pivoted at 24 within an opening in the side wall of hollow member 15, and is biased inwardly as by means of a suitable spring 25. Thus if a portion of the periphery 22ᵃ of extension 12 is aligned with latch 23 the latter will snap into engagement with the walls of the first notch 22 to become alined therewith upon rotary movement of said extension in either direction. Latch 23 is provided with an outward extension 26 which upon manual depression thereof is adapted to withdraw latch 23 to permit angular displacement of the wringer to any one of the other positions thereof in which it will be held upon engagement of latch 23 with the notch 22 corresponding thereto.

Any suitable switch mechanism may be employed for controlling energization and de-energization of motor M. The switch herein illustrated is designated in general by the numeral 27, and the same is preferably a snap switch of the character disclosed in detail in my prior Patents, No. 1,882,259, dated Nov. 29, 1932, and No. 1,977,078, dated Oct. 16, 1934. The mounting means for switch 27 as shown comprises a metal bracket having a relatively short horizontal portion 28 which is attached, as by means of screw or bolt 29, to a downwardly facing shoulder formed upon the interior of member 15. Said bracket has a relatively long portion 30 extending downwardly at a right angle to portion 28—and to portion 30 is attached a relatively thin flat insulating plate 31, as by means of rivets or eyelets 32. Plate 31 is provided with an opening 33 to accommodate a projection 27ᵃ formed integrally with the lower surface of the insulating base of switch 27. A pair of relatively long screws 34 penetrate alined openings in plate 31, the insulating base of switch 27, an insulating plate 35 at the upper surface of the insulating base, and take into tapped openings provided in the inverted channel-shaped top plate 36.

The toggle snap action mechanism of switch 27 comprises a coiled compression spring 37 the lower end of which (not shown) engages a yoke member 38 pivoted to opposite side walls of top plate 36. Fitted into the upper end of spring 37 (Fig. 3) is a cup member 39 engaged by a pin or stud 40 attached to a metal plate 41 which is reciprocable between the side walls of top plate 36. Pin 40 is provided at its upper end with a reduced portion 42 which is received in and guided by the side walls of an opening 43 provided in top plate 36. Plate 41 is provided with openings 44 and 45 which provide clearance between said plate and fastening screws 34—the walls of said openings cooperating with the shanks of said screws to assist in guiding plate 41 during reciprocatory movement of the latter.

Plate 41 is attached by rivet 46 to an insulating plate 47 having an upper end portion of reduced width, which provides a pair of shoulders, one of which is indicated by the dotted line at 48. Said upper end of plate 47 is slidable through an opening 49 provided in a plate 50. A cotter pin 51 or the like extends through plate 47 above plate 50 to insure upward movement of plate 47 with plate 50 when the parts are positioned as shown in Fig. 3. Plate 50 may move downwardly relatively to plate 47, but such relative movement is resiliently opposed by the spring 52 which is interposed between the lower surface of plate 50 and the aforementioned shoulders (48) on plate 47. By this means any undue strain upon the operating elements of switch 27 is avoided.

Plate 50 is of approximately semi-annular form, as indicated in Figs. 1 and 2, and the same has attached to the respective ends therefore a pair of rods 53 and 54, as by upsetting the reduced lower ends of the latter over the lower surface of plate 50, as shown in Fig. 3. Rods 53 and 54 extend upwardly through and are guided by hollow lateral projections 55 and 56 formed integrally with member 15, and the upper ends of said rods are rigidly attached in any suitable manner to a pair of lugs 57 and 58 formed integrally with a metal collar or ring 59 which tends to seat upon an annular shoulder formed upon member 15. The upper edge of ring 59 is of undulatory form—the same preferably having eight projections or hills 60 and eight depressions or valleys 61.

Interposed between the lower edge of ring 59 and the shoulder against which it tends to seat is a plate 62 of approximately semi-annular form—said plate having integral lugs 63 and 64 having downwardly opening bearing notches or recesses (Fig. 1) which pivotally engage the exposed end portions of bolts or screws 65 which take into tapped recesses provided in member 15. Cotter pins 66 or the like are employed to retain plate 62 upon said pivot bolts. Plate 62 is provided with an extension 67 which is adapted when manually depressed to lift ring 59 and its associated parts from the respective positions thereof shown in Fig. 1, thus operating switch 27 from the circuit interrupting position of its parts, shown in Figs. 1 and 3, to the circuit completing position of said switch parts.

The aforementioned projections 60 and depressions 61 upon the upper edge of ring 59 are so related to the end 68 of a lever 69 that said ring cannot be raised to effect closed circuit positioning of the parts of switch 27 except when the wringer is in one of its eight angular positions in which the aforementioned latch 23 will engage one of the notches 22 (Fig. 4). Thus it is to be understood that in Figs. 1 and 6, latch 23 is engaged with one of said notches 22, with consequent vertical alinement of one of the depressions 61 with the aforementioned end 68 of lever 69. It follows that upon manual depression of portion 67 of plate 62 switch 27 will be operated to effect completion of the circuit of motor M—the particular depression or valley 61 affording clearance for lever end 68 whereby ring 59 may be pried or lifted upwardly by plate 62. With the clutch lever 19 in the position thereof shown in Figs. 1 and 2 it may be assumed that the wringer rolls 17 and 18 are operated in a manner to receive and draw therethrough clothes or like material presented to the face of the wringer shown in Fig. 1.

Under the conditions last mentioned it is to be understood that upon manual depression of extension 26 (Figs. 1 and 4) to withdraw latch 23 from the notch 22 with which it was engaged, the wringer may be manually moved or displaced to any other desired rotary or angular position upon its turntable mounting. Upon such rotary or angular movement of the wringer, however, the aforementioned lever end 68 will cooperate with the angular edge of the projection or hill 60 which first engages the same; and due to the fact that lever 69 (see Fig. 6) is restrained against a substantial degree of clockwise movement thereof when the same is positioned as illustrated, the wing 59 will be depressed to effect circuit interrupting operation of switch 27.

After movement of the wringer to an angular position such that latch 23 may engage another of the notches 22, another of the depressions or valleys 61 will be vertically alined with lever end 68; and as a consequence switch 27 may be again operated for completion of the motor circuit by manually depressing extension 67 of plate 62 as aforedescribed. Also it is to be understood that the strength and bias of spring 37 of switch 27 is sufficient to support the weight of ring 59, rods 53 and 54, plate 50, etc., and to resist the tendency of said parts to bias switch 27 to circuit interrupting position.

Referring to Figs. 1 and 6, it will be noted that lever 69 is pivotally supported by a pin or bolt 70 carried by an inverted U-shaped bracket or pair of lugs 71 and 72 attached to portion 21 of casing 13. Pin 70 has a head shown in dotted lines at 73 in Fig. 6 and a cotter pin 74 is attached thereto (Fig. 1) to prevent displacement thereof. The right-hand end of lever 69 (Fig. 6) extends through a substantially U-shaped bracket 75 midway between the arms 76 and 77 of the latter—said bracket 75 having a pair of integral parallel, upstanding arms 78 and 79 arranged at right angles to the arms 76 and 77. Arm 79 is provided with an opening 80 (Fig. 6) to afford clearance for that portion of lever 69 which extends therethrough—the arm 78 having an opening 81 to accommodate the slightly upwardly offset end portion 82 of lever 69. The upper end wall of opening 81 serves to limit the degree of counterclockwise movement of lever 69 under conditions hereinafter described.

Bracket 75 is rigidly attached in any suitable manner (not shown) to the wringer frame 20. As shown in Figs. 5 and 6 the flat lower portion of bracket 75 is provided with a pair of transversely extending bosses or ribs 83 which serve as bearing surfaces for the lower edge of a flat metal plate or strip 84, which is slidable through openings provided in arms 76 and 77—one of said openings being shown at 85 in Fig. 6. Plate 84 extends beyond each of the bracket arms 76 and 77, and a pair of coiled tension springs 86 are respectively attached to arms 76 and 77 and to bolts 87 the unthreaded portions of the shanks of which penetrate pivot openings provided adjacent to opposite ends of said plate 84, and the threaded portions of the shanks of which bolts take into tapped recesses provided in the lower ends of the oppositely arranged arms 88 and 89 of a pair of substantially inverted U-shaped safety release levers—the other arms of which levers are respectively designated by numerals 90 and 91 in Fig. 7, and the connecting portions of which levers are designated by numerals 92 and 93.

As shown in Fig. 5 arms 88 and 89 are pivoted, as by means of cotter pins 94, to parts 95 and 96 formed integrally with the respective arms 76 and 77 of bracket 75. From the foregoing description it will be apparent that the springs 86 act to normally maintain the plate 84 and the safety release levers 92, 93 in the intermediate or neutral positions thereof illustrated in Fig. 5. Plate 84 is provided with an opening 97 located equidistantly from the respective ends thereof. Opening 97 as shown in Fig. 5 is preferably of substantially rectangular form, except that the lower wall of said opening is provided at its mid-length with a V-notch 98 the walls of which converge at substantially a right angle to each other. Notch 98 is adapted to accommodate an intermediate portion of lever 69 in the normal position of the latter shown in Figs. 5 and 6.

Upon movement of either of the safety release levers 92 or 93 in either a counterclockwise or clockwise direction (Fig. 5), with reference to the respective pivots 94, 94, the other lever of the pair will be moved in a like direction, due to pivotal connections (87) between the arms 88 and 89 of said levers with the aforementioned plate 84. Thus, in Fig. 5, upon manual movement of lever 93 in a clockwise direction plate 84 will be drawn toward the left, and as a consequence the right-hand wall of notch 98 will act as a cam to lift the right-hand end of lever 69 (Fig. 6) whereby the left-hand end 68 of said lever will be forced downwardly to depress ring 59 (assuming that said ring had previously been raised to effect completion of the circuit of motor M), with consequent interruption of the motor circuit.

As will be apparent from the structure as best illustrated in Figs. 5 and 6, either a push or a pull upon either of the safety release levers 92 or 93 will result in open-circuit positioning of the contacts of switch 27 to effect interruption of the circuit of motor M. Moreover, it is to be understood that the walls of notch 98 are so related to the other parts of the switch operating mechanism that only a relatively slight degree of movement of either of the levers 92 or 93 in one direction or the other is required to effect circuit interrupting operation of the switch 27—it being pointed out that continued movement of levers 92, 93 and plate 84 is permitted after operation of switch 27 to circuit interruption position, without placing any strain upon the switch parts, or any undue strain upon other elements of the safety device. This characteristic of the device is utilized to render the circuit interrupting elements thereof extremely sensitive and rapid in response to movement of the safety levers 92, 93.

Moreover, the wringer roll releasing elements of the device are so arranged and co-ordinated, as will now be described, that the switch 27 may be operated by one or the other of the safety release levers 92, 93 to interrupt the circuit of motor M without requiring such a degree of movement of said levers 92, 93 as will result in release of the usual spring pressure applied to the wringer roll 18 to hold it in proper engagement with wringer roll 17.

The arrangement just mentioned renders possible the highly desirable feature that the safety release levers 92, 93 shall be used as the normal means for operating switch 27 to its circuit interrupting position. Thus the user of the wringer almost immediately becomes accustomed to use of the safety release levers 92, 93 for effecting interruption of the circuit of the driving motor M, and hence the relative positions and manner of operating such levers 92, 93 are known and proper use thereof is insured in the event of an emergency or threatened accident. By reason of the fact that the operator may normally utilize the levers 92, 93 to effect interruption of the motor circuit, without at the same time necessarily releasing the spring pressure upon the wringer rolls, the operator will have no aversion to normal use of the levers merely as switch controlling means.

More particularly, the desirable results just referred to are attained by providing upon a movable part 99 (Figs. 1 and 6) of the wringer frame 20 a catch member 100 which is adapted to be engaged by the hooked end 101 of a latch member 102. When hooked end 101 of latch 102 is moved downwardly out of engagement with catch 100, member 99 will swing outwardly or in a counterclockwise direction to release the spring pressure applied to the upper roll 18 of the wringer by the previous manual adjustment of knob 103. The means controlled by knob 103 for adjusting the spring pressure upon roll 18 may be of known form, and inasmuch as such means per se forms no part of the present invention detailed description thereof herein is believed to be unnecessary.

As best illustrated in Figs. 6 and 7, the latch member 102 is supported by a substantially U-shaped bracket member 104, which is structurally quite similar to the bracket 75 aforedescribed. Bracket 104 has arms 105 and 106 to the integral extensions 107 and 108 of which are pivotally attached by cotter pins 109 the arms 90 and 91 respectively of safety release levers 92 and 93.

Bracket 104 is provided midway between arms 105 and 106, and at right angles to the latter, with a pair of relatively shorter upstanding arms 110 and 111. Arm 110 (Fig. 6) is provided with an opening 112 to rather freely accommodate the latch member 102—a coiled tension spring 113 being atttached as shown to bracket 104 and to the left-hand end of latch 102, whereby said latch is biased toward the right, and whereby the same is biased toward counterclockwise movement upon the fulcrum provided by the lower end wall of opening 112. A cotter pin 114 or the like penetrates latch 102 at the left-hand side of arm 110 to limit the degree of displacement of said latch toward the right by spring 113. Arm 111 is provided with an opening 115 which is of a size or length to permit the required degree of oscillatory movement of said latch.

A plate or strip 116 penetrates alined openings provided in the arms 105 and 106 of bracket 104, and is pivotally attached adjacent to its respective ends to the arms 90 and 91 of levers 92 and 93, as by means of bolts 117 (Fig. 7). Plate 116 is provided midway between its ends with an opening of the form best illustrated at 118 in Fig. 8. Thus opening 118 is provided with an upper edge or wall having an intermediate horizontal portion 119, the length of which is substantially greater than the width of latch member 102, and divergent angularly arranged upper wall portions 120 and 121 on opposite sides respectively of portion 119.

The lower horizontal wall 122 of opening 118 is provided at its mid-length with a projection having a flat upper edge 123 of a length corresponding to the length of wall portion 119, with which it is vertically alined. Said projection is provided at opposite sides of edge 122 with downwardly sloping edge portions 124 and 125. The arrangement is such that latch 102 cannot move downwardly to a sufficient degree to cause disengagement of hook end 101 from catch 100 until plate 116 has moved in one direction or another to a sufficient degree to cause edge 123 to clear the lower edge of latch 102 (Fig. 8), whereby said latch is moved downwardly by the camming action of wall portion 120 or 121 to effect disengagement of hook 101 from catch 100, thus releasing part 99 for counterclockwise movement (Fig. 6) to remove the spring pressure from the upper wringer roll 18 (Fig. 1).

The substantial degree of movement of plate 116 in either direction without releasing the spring pressure from the wringer rolls is sufficient to insure previous operation of switch 27 to circuit interrupting position through the action of plate 84 upon lever 69. As aforeindicated, therefore, plate 84 may readily be moved by lever 92 or lever 93 in one direction or the other to a degree sufficient to effect circuit interrupting positioning of the parts of switch 27 without requiring a sufficient degree of movement of plate 116 to cause release of latch 102 from catch 100. Similarly, it will be noted that action of lever end 68 (Fig. 6) against ring 59 to effect circuit interrupting operation of switch 27 upon angular displacement of the wringer upon its turntable in nowise affects the spring pressure releasing elements controlled by plate 116. As indicated at 126 in Fig. 6, bracket 104 is provided with a plurality of ribs or bosses against which the lower edge of plate 116 is adapted to bear.

Brackets 75 and 104 have attached thereto as by means of screws or bolts 127 (Figs. 5 and 7) a drain-pan 128 of substantially semi-cylindrical form—said pan having a plurality of openings 129 formed therein to discharge to a washer tub or rinsing tub the water or other liquid collected thereby. Drainpan 128 (see Fig. 2) has associated therewith the angularly extending drain portions shown in dotted lines at 130 and 131—portions 130 and 131 having associated therewith the skirt portions 132, 133; the enclosing side portions 134, 135; and the upwardly angled portions 136 and 137. As illustrated in Figs. 1 and 5 angled portions 136 and 137 are provided with cut-outs or openings, such as shown at 138 to provide operating clearance for the arms of the respective levers 92 and 93.

What I claim as new and desire to secure by Letters Patent is:

1. In a safety device for power operated wringers, in combination, a wringer frame, a pair of wringer rolls supported thereby, power operated means for driving at least one of said rolls, manually adjustable means for exerting the desired degree of pressure upon said rolls, a safety release lever having a portion located adjacent said rolls in a plane parallel thereto and substantially within the area of one face thereof, and means mechanically interconnecting said power operated means, said manually adjustable means and said lever whereby the latter is manually operable in either direction from a given position thereof through a predetermined range to first discontinue driving of said rolls by said power operated means and to thereafter effect release of the pressure applied to said rolls, the arrangement being such that said lever is manually operable at will in either direction from said given position thereof through a relatively small portion of said predetermined range to effect discontinuance of the drive of said rolls without effecting release of the pressure applied to said rolls.

2. In a safety device for electric motor operated wringers, in combination, a wringer frame, a pair of wringer rolls supported thereby, an electric motor for driving at least one of said rolls, manually adjustable means for exerting the desired degree of pressure upon said rolls, a manually operable switch adapted when closed to complete the energizing circuit of said driving motor, a safety release lever having a portion located adjacent said rolls in a plane parallel thereto and substantially within the area of one face thereof, means mechanically interconnecting said switch and said lever whereby the latter is manually operable in either direction from a given position thereof through a relatively small portion of its total range to effect opening of said switch for interruption of the energizing circuit of said driving motor, and additional means mechanically interconnecting said manually adjustable means and said lever whereby said lever may be thereafter manually operable at will in a corresponding direction through another portion of its total range to effect release of the pressure applied to said rolls, the arrangement being such that said safety release lever may be utilized normally as the sole means for effecting interruption of the circuit of said driving motor.

3. In a safety device for electric motor operated wringers, in combination, a wringer frame, a pair of wringer rolls supported thereby, an electric motor for driving at least one of said rolls, manually adjustable means for exerting the desired degree of pressure upon said rolls, an electric switch adapted when closed to complete the energizing circuit of said driving motor, means manually operable to effect closure of said switch but incapable of effecting opening of the latter, a safety release lever having a portion located adjacent said rolls in a plane parallel thereto and substantially within the area of one face thereof, means mechanically interconnecting said switch and said lever whereby the latter is manually operable in either direction from a given position thereof through a relatively small portion of its total range to effect opening of said switch for interruption of the circuit of said driving motor, said lever being adapted for use as the sole normal means for effecting stopping of said motor, and additional means mechanically interconnecting said manually adjustable means and said lever whereby said lever may be manually operated thereafter in a corresponding direction through an additional portion of its total range to effect release of the pressure applied to said rolls.

4. In a safety device for power operated wringers, in combination, a wringer frame, a pair of wringer rolls supported thereby, power operated means for driving one of said rolls, manually adjustable means for exerting the desired degree of pressure upon said rolls, a pair of safety release levers having portions thereof located adjacent said rolls in planes parallel thereto and substantially within the areas of the opposite faces thereof respectively, said power operated means, said manually adjustable means and said levers having interconnected means so that when either of the latter is manually operated in either direction from a given position thereof through a predetermined range it will first discontinue driving of said roll first mentioned and thereafter effect release of the pressure applied to said rolls, and either of said levers being also manually operable at will in either direction from said given position thereof through a relatively smaller range to effect discontinuance of the drive of said roll first mentioned without effecting release of the pressure applied to said rolls.

5. In a safety device for electric motor operated wringers, in combination, a wringer frame, a pair of wringer rolls supported thereby, an electric motor for driving one of said rolls, manually adjustable means for exerting the desired degree of pressure upon said rolls, a manually operable switch adapted when closed to complete the energizing circuit of said driving motor, a pair of safety release levers having portions thereof located adjacent said rolls in planes parallel thereto and substantially within the areas of the opposite faces thereof respectively, said switch and said levers having interconnected means so that when either of the latter is manually operated in either direction from a given position thereof through a relatively small portion of its total range it will effect opening of said switch whereby the energizing circuit of said driving motor is interrupted, and said manually adjustable means and said levers also having interconnected means whereby either of said levers may also be thereafter manually operated at will in a corresponding direction through another portion of its total range to effect release of the pressure applied to said rolls, the arrangement being such that either of said safety release levers may be utilized normally as the means for effecting interruption of the circuit of said driving motor.

6. In a safety device for electric motor operated wringers, in combination, a wringer frame, a pair of wringer rolls supported thereby, an electric motor for driving one of said rolls, manually adjustable means for exerting the desired degree of pressure upon said rolls, an electric switch adapted when closed to complete the energizing circuit of said driving motor, means manually operable to effect closure of said switch but incapable of effecting opening of the latter, a pair of safety release levers having portions thereof located adjacent said rolls in planes parallel thereto and substantially within the areas of the opposite faces thereof respectively, said switch and said levers having interconnected means so that when either of the latter is manually operated in either direction from a given position thereof through a relatively small portion of its total range it will effect opening of said switch with consequent interruption of the circuit of said driving motor, whereby either of said levers may be utilized as the normal means for effecting stopping of said motor, and said manually adjustable means and said levers also having interconnected means whereby either of the latter may be manually operated thereafter in a corresponding direction through an additional portion of its total range to effect release of the pressure applied to said rolls.

7. In a safety device for electric motor operated wringers, in combination, a wringer frame, a pair of wringer rolls supported thereby, manually adjustable means carried by said frame for exerting a predetermined degree of pressure upon said rolls relatively to each other, an electric motor adapted when energized to drive said rolls, an electric switch adapted when closed to effect energization of said motor, manual means operable to effect closure of said switch but incapable of effecting opening of the same, additional manual means operable to effect opening of said switch whereby said motor is deenergized, said last mentioned means comprising a pair of safety release levers interconnected with each other and with said switch and respectively arranged adjacent said rolls at opposite faces of the latter, whereby either of said levers may be operated to effect opening of said switch, means interconnecting said manually adjustable means and said levers whereby either of the latter may also be operated at will after opening of said switch to effect release of the pressure upon said rolls, a turntable upon which said wriger frame is rotatably supported, said electric switch being supported by said turntable in spaced relation to said wringer frame, and cooperating elements carried by said turntable and by said wringer frame, said co-operating elements including certain elements of the interconnection between said safety release levers and said switch and acting upon rotation of said wringer frame relatively to said turntable to effect opening of said switch independently of said safety release levers.

8. In a safety device for electric motor operated wringers, in combination, a wringer frame, a pair of wringer rolls supported thereby, manually adjustable means carried by said frame for exerting a predetermined degree of pressure upon said rolls relatively to each other, an electric motor adapted when energized to drive said rolls, an electric switch adapted when closed to effect energization of said motor, manual means operable to effect closure of said switch but incapable of effecting opening of the same, additional manual means operable to effect opening of said switch whereby said motor is deenergized, said last mentioned means comprising a pair of safety release levers interconnected with each other and with said switch and respectively arranged adjacent said rolls at opposite faces of the latter, whereby either of said levers may be operated to effect opening of said switch, means interconnecting said manually adjustable means and said levers whereby either of the latter may also be operated at will after opening of said switch to effect release of the pressure upon said rolls, a turntable upon which said wringer frame is rotatably supported, said electric switch being supported by said turntable in spaced relation to said wringer frame, cooperating elements carried by said turntable and by said wringer frame, said cooperating elements including certain elements of the interconnection between said safety release levers and said switch and acting upon rotation of said wringer frame relatively to said turntable to effect opening of said switch independently of said safety release levers, and manually releasable latching means for retaining said wringer frame in any one of a number of rotary positions relatively to said turntable.

9. In a safety device for electric motor operated wringers, in combination, an electric motor, a shaft to be driven thereby, a pedestal within which said shaft is rotatably mounted, forward, reverse and neutral gearing carried by said pedestal and bodily movable rotatably with respect thereto, a wringer frame associated with said gearing and rotatably movable jointly with the latter, a pair of wringer rolls carried by said frame, one of said rolls being operatively connected with said gearing, manually adjustable means carried by said frame for exerting the desired spring pressure of said rolls relatively to each other, an electric switch carried by and enclosed within said pedestal, manual means carried by said pedestal and operable to effect closure of said switch but incapable of effecting opening of the latter, said switch when closed being adapted to effect energization of said motor, manual means for operating said gearing from neutral position to effect driving of said rolls in a forward or reverse direction, manually releasable latching means carried by said pedestal for retaining said gearing and said wringer frame in any one of a number of rotary positions, and cooperating means carried by said pedestal and by said frame to effect opening of said switch upon rotary movement of said frame relatively to said pedestal.

10. In a safety device for electric motor operated wringers, in combination, an electric motor, a shaft to be driven thereby, a pedestal within which said shaft is rotatably mounted, forward, reverse and neutral gearing carried by said pedestal and bodily movable rotatably with respect thereto, a wringer frame associated with said gearing and rotatably movable jointly with the latter, a pair of winger rolls carried by said frame, one of said rolls being operatively connected with said gearing, manually adjustable means carried by said frame for exerting the desired spring pressure of said rolls relatively to each other, an electric switch carried by and enclosed within said pedestal, manual means carried by said pedestal and operable to effect closure of said switch but incapable of effecting opening of the latter, said switch when closed being adapted to effect energization of said motor, manual means for operating said gearing from neutral position to effect driving of said rolls in a forward or reverse direction, manually releasable latching means carried by said pedestal for retaining said gearing and said wringer frame in any one of a number of rotary positions, cooperating means carried by said pedestal and by said frame to effect opening of said switch upon rotary movement of said frame relatively to said pedestal, and manually operable means carried jointly by said wringer frame and said pedestal to effect opening of said switch at will, said manually operable means comprising a pair of safety release levers arranged adjacent said wringer rolls at opposite faces of the latter, said levers being mechanically interconnected with each other and with the cooperating means aforementioned whereby either of said levers is operable in either direction through a relatively small portion of its total range to effect such opening of said switch.

11. In a safety device for electric motor operated wringers, in combination, an electric motor, a shaft to be driven thereby, a pedestal within which said shaft is rotatably mounted, forward, reverse and neutral gearing carried by said pedestal and bodily movable rotatably with respect thereto, a wringer frame associated with said gearing and rotatably movable jointly with the latter, a pair of wringer rolls carried by said frame, one of said rolls being operatively connected with said gearing, manually adjustable means carried by said frame for exerting the desired spring pressure of said rolls relatively to each other, an electric switch carried by and enclosed within said pedestal, manual means carried by said pedestal and operable to effect closure of said switch but incapable of effecting opening of the latter, said switch when closed being adapted to effect energization of said motor, manual means for operating said gearing from neutral position to effect driving of said rolls in a forward or reverse direction, manually releasable latching means carried by said pedestal for retaining said gearing and said wringer frame in any one of a number of rotary positions, cooperating means carried by said pedestal and by said frame to effect opening of said switch upon rotary movement of said frame relatively to said pedestal, manually operable means carried jointly by said wringer frame and said pedestal to effect opening of said switch at will, said manually operable means comprising a pair of safety release leavers arranged adjacent said wringer rolls at opposite faces of the latter, said levers being mechanically interconnected with each other and with the cooperating means aforementioned whereby either of said levers is operable in either direction through a relatively small portion of its total range to effect such opening of said switch, and said levers being also mechanically interconnected with said manually adjustable means whereby either of the same may be further operated in a corresponding direction through an additional portion of its total range to effect release of the spring pressure upon said rolls.

12. In a safety device for electric motor operated wringers, in combination, a hollow pedestal, a shaft rotatably mounted within said pedestal, an electric motor adapted when energized to drive said shaft, an electric switch carried by and enclosed within said pedestal and adapted when closed to effect energization of said motor, manual means carried by said pedestal and operable to effect closure of said switch but incapable of effecting opening of the latter, a gear box and a wringer frame connected with each other and jointly rotatable with respect to said pedestal, a pair of wringer rolls carried by said frame, manually adjustable means for exerting a desired degree of pressure of said rolls relatively to each other, forward, reverse and neutral gearing within said gear box and manual control means therefor, said gearing being associated with one of said rolls to provide for disconnection of the latter from said shaft or for effecting rotation of said roll in one direction or the other, said switch closing means including a ring surrounding said pedestal and having an undulatory upper edge, a lever pivotally supported relatively to said wringer frame and having one end thereof overlying said undulatory edge, and said lever end cooperating with said undulatory edge to effect depression of said ring with consequent opening of said switch upon rotation of said wringer frame relatively to said pedestal.

13. In a safety device for electric motor operated wringers, in combination, a hollow pedestal, a shaft rotatably mounted within said pedestal, an electric motor adapted when energized to drive said shaft, an electric switch carried by and enclosed within said pedestal and adapted when closed to effect energization of said motor, manual means carried by said pedestal and operable to effect closure of said switch but incapable of effecting opening of the latter, a gear box and a wringer frame connected with each other and jointly rotatable with respect to said pedestal, a pair of wringer rolls carried by said frame, manually adjustable means for exerting a desired degree of pressure of said rolls relatively to each other, forward, reverse and neutral gearing within said gear box and manual control means therefor, said gearing being associated with one of said rolls to provide for disconnection of the latter from said shaft or for effecting rotation of said roll in one direction or the other, said switch closing means including a ring surrounding said pedestal and having an undulatory edge, a lever pivotally supported relatively to said wringer frame and having one end thereof overlapping said undulatory edge, said lever end cooperating with said undulatory edge to effect movement of said ring with consequent opening of said switch upon rotation of said wringer frame relatively to said pedestal, and said pedestal having a manually releasable latch associated therewith for retaining said wringer frame in any one of a number of rotary positions relatively to said pedestal.

14. In a safety device for electric motor operated wringers, in combination, a hollow pedestal, a shaft rotatably mounted within said pedestal, an electric motor adapted when energized to drive said shaft, an electric switch carried by and enclosed within said pedestal and adapted when closed to effect energization of said motor, manual means carried by said pedestal and operable to effect closure of said switch but incapable of effecting opening of the latter, a gear box and a wringer frame connected with each other and jointly rotatable with respect to said pedestal, a pair of wringer rolls carried by said frame, manually adjustable means for exerting a desired degree of pressure of said rolls relatively to each other, forward, reverse and neutral gearing within said gear box and manual control means therefor, said gearing being associated with one of said rolls to provide for disconnection of the latter from said shaft or for effecting rotation of said roll in one direction or the other, said switch closing means including a ring surrounding said pedestal and having an undulatory edge, a lever pivotally supported relatively to said wringer frame and having one end thereof overlapping said undulatory edge, said lever end cooperating with said undulatory edge to effect movement of said ring with consequent opening of said switch upon rotation of said wringer frame relatively to said pedestal, a pair of inverted U-shaped safety release levers carried by said wringer frame at opposite faces respectively of said rolls and angled outwardly with respect thereto, the arm portions of said levers being pivotally supported, a pair of plates slidable relatively to said wringer frame adjacent the respective ends of the rolls and to opposite ends of which plates the arms of said levers are respectively connected, spring means for biasing said levers toward the intermediate positions thereof respectively, and one of said plates cooperating with said lever first mentioned to insure opening of said switch upon a relatively small degree of movement of either of said safety release levers in one direction or the other, whereby said safety release levers may be utilized selectively to normally provide for interruption of the circuit of said driving motor.

15. In a safety device for electric motor operated wringers, in combination, a hollow pedestal, a shaft rotatably mounted within said pedestal, an electric motor adapted when energized to drive said shaft, an electric switch carried by and enclosed within said pedestal and adapted when closed to effect energization of said motor, manual means carried by said pedestal and operable to effect closure of said switch but incapable of effecting opening of the latter, a gear box and a wringer frame connected with each other and jointly rotatable with respect to said pedestal, a pair of wringer rolls carried by said frame, manually adjustable means for exerting a desired degree of pressure of said rolls relatively to each other, forward, reverse and neutral gearing within said gear box and manual control means therefor, said gearing being associated with one of said rolls to provide for disconnection of the latter from said shaft or for effecting rotation of said roll in one direction or the other, said switch closing means including a ring surrounding said pedestal and having an undulatory upper edge, a lever pivotally supported relatively to said wringer frame and having one end thereof overlying said undulatory edge, said lever end cooperating with said undulatory edge to effect depression of said ring with consequent opening of said switch upon rotation of said wringer frame relatively to said pedestal, a pair of inverted U-shaped safety release levers carried by said wringer frame at opposite faces respectively of said rolls and angled outwardly with respect thereto, the arm portions of said levers being pivotally supported, a pair of plates slidable relatively to said wringer frame adjacent the respective ends of the rolls and to opposite ends of which plates the arms of said levers are respectively connected, spring means for biasing said levers toward the intermediate positions thereof respectively, one of said plates cooperating with said lever first mentioned to insure opening of said switch upon a relatively small degree of movement of either of said safety release levers in one direction or the other, whereby said safety release levers may be utilized selectively to normally provide for interruption of the circuit of said driving motor, and means associated with the other of said plates to effect release of the pressure of said wringer rolls relatively to each other upon a relatively greater degree of movement of either of said safety release levers in a corresponding direction.

16. In a safety device for electric motor operated wringers, in combination, a hollow pedestal, an electric switch carried by and enclosed within said pedestal, manual means carried by said pedestal and operable to effect closure of said switch but incapable of effecting opening of the latter, a gear box and wringer frame connected with each other and jointly rotatable with respect to said pedestal, a pair of wringer rolls carried by said frame, manually adjustable means for exerting a desired degree of pressure of said rolls relatively to each other, said switch closing means including a ring surrounding said pedstal and having an undulatory edge, a lever pivotally supported relatively to and bodily movable with said wringer frame and having one end thereof overlapping said undulatory edge, means for normally restraining said lever against pivotal movement in one direction, whereby said end thereof cooperates with said undulatory edge to effect movement of said ring with consequent opening of said switch upon rotation of said wringer frame relatively to said pedestal, a pair of safety release levers of substantially inverted U-shape carried by said wringer frame at opposite faces respectively of said rolls, the arm portions of said last mentioned levers being pivotally supported, a pair of plates carried by and slidable relatively to said wringer frame adjacent the respective ends of the rolls and to opposite ends of which plates the arms of said safety release levers are respectively connected, one of said plates being mechanically engaged with said overlapping lever first mentioned to likewise effect movement of said ring with consequent opening of said switch upon a relatively small degree of movement of either of said safety release levers in one direction or the other, and means including a latch mechanically engaged by the other of said plates to effect release of the pressure of said wringer rolls relatively to each other upon a predetermined degree of further movement of either of said safety release levers in a corresponding direction.

17. In a safety device for power operated wringers, in combination, a wringer frame, a pair of wringer rolls supported thereby, power operated means for driving at least one of said rolls, manually adjustable means for exerting the desired degree of pressure upon said rolls, a pair of safety release levers located adjacent said rolls at opposite faces thereof respectively, means for mechanically interconnecting said power operated means, said manually adjustable means and said levers whereby either of said levers is manually operable in either direction from a given position thereof through a predetermined range to first discontinue driving of said rolls by said power operated means and to thereafter effect release of the pressure applied to said rolls, and each of said levers being also operable at will in either direction from a given position thereof through a relatively small portion of said predetermined range to effect discontinuance of the driving of said rolls without effecting release of the pressure applied to said rolls.

18. In a safety device for electric motor operated wringers, in combination, a wringer frame, a pair of wringer rolls supported thereby, an electric motor adapted when energized to drive one of said rolls, an electric switch adapted when closed to effect energization of said motor, adjustable means for exerting the desired degree of pressure upon said rolls, a safety release lever located adjacent said rolls at one face thereof, said lever having interconnected means so that when manually operated through a predetermined range it will first effect opening of said switch and thereafter effect release of the pressure applied to said rolls, said lever being thus operable at will to effect opening of said switch without effecting release of the pressure applied to said rolls, a turntable upon which said wringer frame is rotatably supported, said electric switch being supported by said turntable in spaced relation to said wringer frame, and said interconnected means comprising cooperating elements carried by said turntable and by said wringer frame to provide for opening of said switch by said safety release lever.

GEORGE J. MEUER.